United States Patent [19]

Wong

[11] Patent Number: 5,615,110
[45] Date of Patent: Mar. 25, 1997

[54] SECURITY SYSTEM FOR NON-CASH TRANSACTIONS

[76] Inventor: Kam-Fu Wong, c/o Star Paging (Holding) Ltd., 1/F., Chung Nam Centre, 414 Kwun Tong Road, Kwun Tong, Kowloon, Hong Kong

[21] Appl. No.: 294,144

[22] Filed: Aug. 22, 1994

[30] Foreign Application Priority Data

May 19, 1994 [CN] China ................... 94105095.5

[51] Int. Cl.$^6$ .................. G06F 17/60; G08B 5/22
[52] U.S. Cl. ............... 395/238; 379/91; 379/95; 340/825.3; 340/825.32; 340/825.33; 340/825.34; 340/825.44; 235/379; 235/380; 395/244
[58] Field of Search ................... 364/401, 408; 379/91, 95; 340/825.31, 825.32, 825.33, 825.34, 825.44; 235/379, 380

[56] References Cited

U.S. PATENT DOCUMENTS

| | | | |
|---|---|---|---|
| 4,644,351 | 2/1987 | Zabarsky et al. | 340/825.44 |
| 5,005,014 | 4/1991 | Jasinski | 340/825.44 |
| 5,208,446 | 5/1993 | Martinez | 235/80 |
| 5,321,751 | 6/1994 | Ray et al. | 380/23 |
| 5,335,246 | 8/1994 | Yokev et al. | 375/1 |
| 5,416,306 | 5/1995 | Imahata | 235/380 |
| 5,530,438 | 6/1996 | Bickham et al. | 340/825.34 |

OTHER PUBLICATIONS

"Future of mobile Satellite shows potential . . . " Industrial Communcations; Phillips Publishing Inc. Jul. 7, 1989.

Primary Examiner—Gail O. Hayes
Assistant Examiner—Gita D. Shingala
Attorney, Agent, or Firm—Armstrong, Westerman, Hattori, McLeland & Naughton

[57] ABSTRACT

When a non-cash transaction occurs, the corresponding computer account writing system will be in operation. The computer account writing system outputs information signals which include the transaction (non-cash instant payment) information and the private address code of the true owner recorded in the system, to the transaction signal transmitting station. The transaction signal transmitting station immediately sends out the transaction information signals according to the ID code or the true owner in the covering area. The true owner can rapidly receive the signals by all account receiver carried by him/her, and can be informed that a transaction involving one of his accounts, is taking place. According to the signals received, the true owner can make a determination at once whether he should take action or not. If, within an arranged period of time the true owner does not take ally action, then it is determined that the true owner agrees to the transaction. If the true owner believes that the transaction is illegal and is due, for example, to a stolen card or phone, he can use a communication means such as a telephone, to inform the corresponding computer account writing system. The computer account writing system will send back signals to the location where the transaction is taking place, to show a refusal of payment. Thus, the loss to the true owner and the company, bank, etc., involved, is minimized or prevented.

26 Claims, 7 Drawing Sheets

SECURITY SYSTEM FOR NON-CASH TRANSACTIONS

BACKGROUND OF THE INVENTION:

The present invention relates to a wireless communication method and apparatus whereby the true owner of, for example, a credit card or mobile telephone, can prevent others from using the same in the event of a loss or theft of the credit card, mobile telephone, and the like. When a non-cash transaction occurs, such as when an attempt is made to use a credit card or place a call with a mobile telephone, the method and apparatus of the present invention allow for the true owner of the credit card and/or mobile telephone to immediately know that the transaction is taking place so that the true owner can take necessary action to prevent the illegal use.

Presently, more and more non-cash transactions take place, such as when customers purchase items in stores, use private mobile telephones and cellular telephones to make local calls, long distance calls, across the border roaming calls, etc., and subsequently, to settle for payment monthly or quarterly using non-cash methods of payment such as credit cards, club cards, telephone cards, etc. Such non-cash transactions, may occur in restaurants, hotels, housing, purchasing airline tickets, train tickets, etc., after which, payment is made upon receipt of a bill from the card company. Sometimes, private codes are utilized, such as when customers utilize telephones or computers to input their private codes in order to made the payments.

When consumers use a non-cash method of payment to pay bills, they need not carry with them a large sum of money (cash). Thus, they do not have a risk of losing a large amount of cash, not to mention the added convenience of non-cash payments and reduction in contact with stolen bank notes.

However, non-cash transactions result in particular problems and risks. Though consumption by using credit cards, or cellular telephones, are based on the development of modern electronic technology, computer technology and modern communication technology, these technologies can also cause problems with respect to the security of the card, phone, etc. Sometimes individuals utilize advanced technology in order to accomplish illegal acts, such as stealing other peoples' credit cards and cellular telephones and making use of the same. In particular, because non-cash transactions are taking place at much greater frequency throughout the world, the risks involved are ever increasing.

Some examples of dangers inherent in non-cash transactions are as follows: When a consumers mobile telephone is lost, or the inside parameters of the mobile telephone are stolen (such as ESN or MIN), the thief can make an illegal reproduction of the mobile telephone and extensively use the telephone with the charges being sent to the true owner. Also, when consumers' credit cards are lost or stolen, the stolen card can be reproduced and the true owner of the credit card or the bank issuing the credit card, or the company accepting the credit card can suffer large losses.

Records show that at present, more than twenty million credit cards are registered as lost every year. In addition, the loss of money due to the use of fake credit cards is a high as several hundred million dollars a year. However, until now, there has not been an effective way to prevent this large amount of fraud involved in non-cash transactions.

SUMMARY OF THE INVENTION

An object of the present invention is to solve the above-mentioned problems with respect to non-cash transactions. The present invention involves a security system for non-cash transactions, whereby even if the true owner of a credit card, member card, mobile telephone, etc., is not aware that his card and/or telephone has been lost or stolen, he can immediately be informed that another person is utilizing his card and/or telephone at the time of the transaction. Then, the true owner can determine whether the use by the other person is illegal or legal. If the use is illegal, the true owner can take immediate action to inform the bank and/or telephone company to prevent the illegal use, disallow the purchase at hand, prevent the telephone call, etc., so that the loss to the true owner, bank, telephone company, etc., can be minimized or prevented.

BRIEF DESCRIPTION OF THE DRAWINGS

The invention will be described in detail with reference to the follow figures in which like elements are denoted with like reference numerals, and wherein.

DETAILED DESCRIPTION OF THE PREFERRED EMBODIMENTS

The present invention is based on the development of modern computer technology and wireless paging communication technology. In this description, "transaction" refers to any non-cash transaction such as a payment action utilizing credit cards, telephone calls made by a secret code telephone, cellular phones, mobile telephones, etc. Because a signal will be released when the credit card is being read by a credit card reading device and when the telephone is in dialing mode, the various card reading devices and mobile/cellular telephones will be referred to as "transaction devices".

Figure 1:
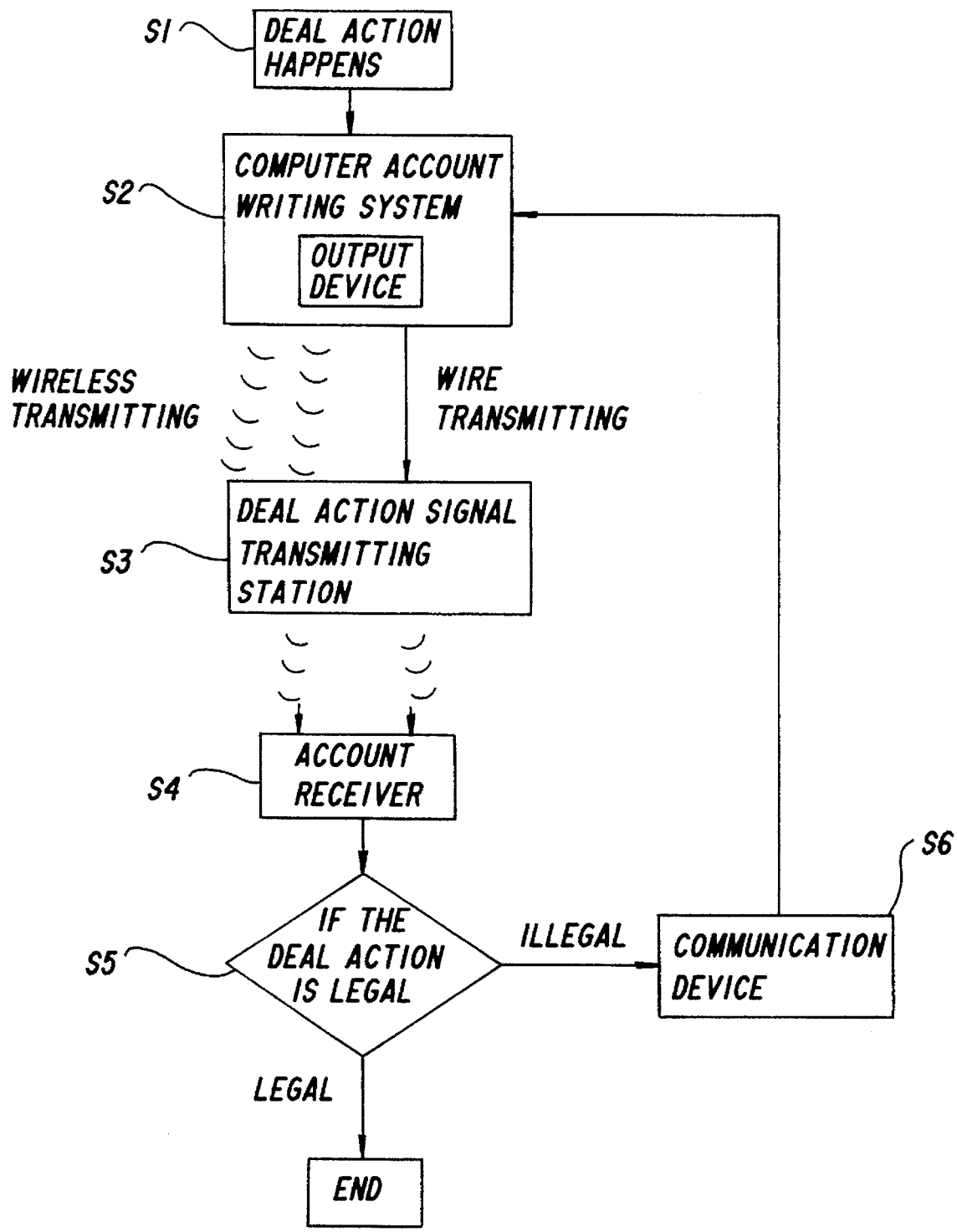
FIG. 1 is a flow chart illustrating the method of the prevent invention.

Referring to FIG. 1, when use is made of a mobile telephone such as a cellular telephone, car telephone, etc. to make a call or when a bill is paid or a purchase is made by credit card, a "transaction" takes place (step S1). Dialing the mobile telephone will let the computer account writing system of the telephone company start operating to calculate and record the time, place, distance and fees involved with that particular telephone call. Likewise, when one uses a credit card to pay fees or make a purchase, the credit card is read by a credit card reading device, and the corresponding computer account writing system of the bank begins to operate to record the fee changes in the card and in the bank (step S2). At that time, the computer account writing system will create electric transaction signals. The computer account writing system will refer to the private address code of the true owner, by utilizing the output device set in the computer account writing system, and output the signals including the transaction signals to a transaction signal transmitting station by way of wireless transmitting or telephone network or communication cables (step S3). The transaction signal transmitting station for processing the input signals and edit codes and then transmit out to the cover area to an account receiver (step S4). Then, the true owner of the credit card and/or mobile telephone can be informed of the transaction and make a determination whether the transaction is legal or not (step S5). If the true owner determines that the transaction is legal, then no further steps need be taken by him/her. However, if the true owner determines that the transaction may be illegal, the true owner can communicate via a communication device (step S6) with the computer account writing system to immediately end the transaction.

As an example, a symbol such as "B25" is illustrated on the display panel of the account receiver of the true owner, which symbol indicates that the credit card is being used to make a $25.00 purchase. Or, if the symbol "STBJ" is displayed on the display panel of the account receiver, this would indicate, for example, that the cellular telephone of the true owner is being used to dial Beijing. At the time of receiving these symbols on the account receiver, the true owner can determine at once what the transaction is that is taking place, and whether this transaction is authorized by him/her, or whether the transaction is illegal (e.g., whether the cellular telephone is used by a thief, whether the credit card is a fake reproduction based on stolen codes, etc.). Based upon a predetermined period of time, for example, within two or three minutes, if the computer account writing system does not receive a communication to stop the transaction, the transaction will proceed. However, if the true owner believes that the transaction is illegal, he can immediately Use any communication device such as a telephone, to inform the computer account writing system that the use is illegal. The computer account writing system will send arranged signals back to the transaction device and inform the transaction device to refuse/stop the transaction. For example, the signal on the screen of the credit card reading device which show a refusal of the card, or the signal transmitted would make the call being made by the particular cellular telephone. In this way, avoiding or substantially reducing losses to the true owner, bank, telephone company, etc., can be achieved. And, further transactions can also be eliminated. Due to advances in electronic communication technology, the time of the whole process may be around one or two minutes, or shorter.

Figure 2:
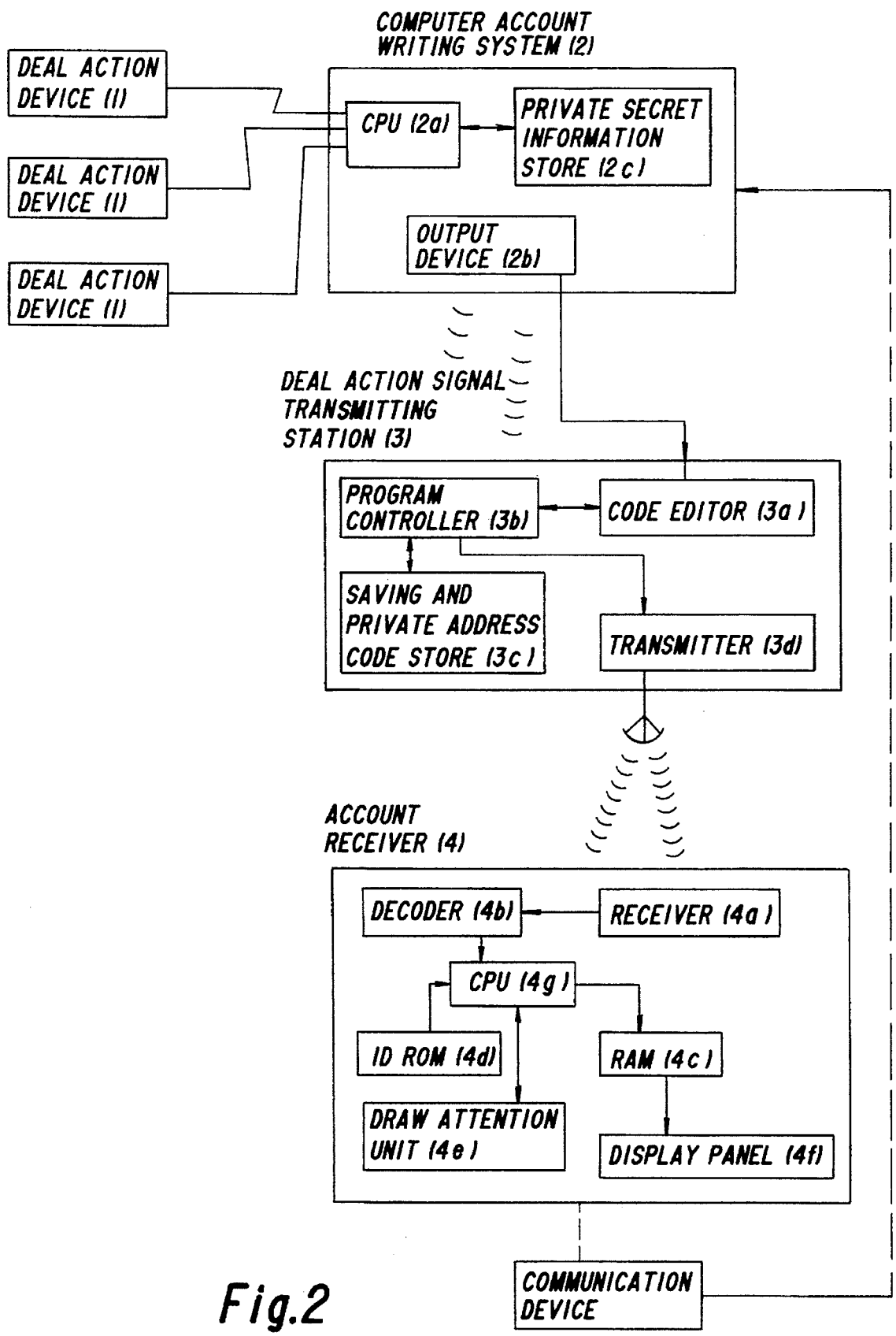
FIG. 2 is a block diagram of the apparatus of the present invention.

FIG. 2 is an illustration of a first embodiment of the apparatus of the present invention. The apparatus includes a plurality of transaction devices 1, one or more corresponding computer account writing systems 2, one or more transaction signal transmitting stations 3, and plurality of account receivers 4, and one or more communication devices. The transaction devices 1 generically refer to the previously mentioned credit card reading devices, cellular telephones, etc., which are the means for performing a non-cash transaction and for generating transaction signals and sending the transaction signals to the computer account writing system 2. The computer account writing system 2 includes CPU 2A, output device 2B, private secret information store 2C. CPU 2A is for recording the transaction information, which, if this is in a bank computer, the information will be the place of using the credit card, the time, date, charge amount, card number, etc. If the computer is a telephone company computer, the information will be, for example, the number of the cellular telephone number dialed, the time and date, the length of the call, etc. The CPU 2A will refer to the private address code stored in the private secret information store 2C, process the signals inputted from the translation device 1 and send the processed signals, including the transaction signals, to the output device 2B. The output device 2B immediately outputs all the information signals to the transaction signal transmitting station 3 by way of wireless transmitting or via wired communication such as a telephone network or communication cable. The transaction signal transmitting station 3 includes code editor 3a, programmed controller 3b, saving and private address code store 3c, and transmitter 3d, which take the incoming information signals and refer to the private secret code of the true owner in the saving and private address code store 3c to encoding and code editor 3a. The program controller 3b transfers the coded signals to the transmitter 3d, and the transmitter 3d immediately transmits the coded transaction information to the cover area which can be received by the true owner.

The true owner must have an account receiver 4 for receiving the transaction information. The account receiver 4 is made tip of receiver 4a, decoder 4b, CPU 4g, RAM 4c, draw attention unit 4e, display panel 4f and ID ROM 4d. Receiver 4a receives the encoded transaction information signals transmitted by the transaction signal transmitting station 3 and sends the signals to the decoder 4b. Decoder 4b refers to the private address code of the true owner in ID ROM 4d and decodes the transaction information signals and sends the signals to CPU 4g. CPU 4g controls the programs and arrangements and starts tip the draw attention unit 4e, display panel 4f and RAM 4c. The draw attention unit 4e can be made up of a sound device, a vibration unit, LCD unit, etc., and is used to let the true owner of the account receiver 4 hear/detect/see that a transaction concerning one of his accounts is taking place. Display panel 4f immediately shows the information concerning the transaction. RAM 4c is a memory area and stores the transaction information temporarily. When the true owner needs to, he can use the information stored in RAM 4c. When the true owner does not need to again, he can input instructions to clear tip the information stored in the memory RAM 4c. The true owner can make the judgment from the symbols shown on display panel 4f that the transaction is legal or illegal. If the transaction is arranged by the true owner himself, such as when the company manager uses the company credit card to pay the bill for inviting company guests for dinner, the transaction is legal. The true owner of the credit card need not take any action. The transaction will be finished smoothly. If the symbols shown on the display panel 4f let the true owner find that the transaction is illegal, such as the transaction is by someone using his cellular telephone, and his cellular telephone was recently lost, or when the transaction is a fake credit card with the stolen information someone is using to pay a bill, the true owner may use any communication device, such as a telephone to inform the corresponding computer account writing system 2 to refuse or stop the illegal transaction. The computer account writing system 2 will, according to the order of the true owner, send instruction signals to refuse or stop the transaction back to transaction device 1, for example, back to the credit card reading device 1 and displays a refusal of payment, (or back to the mobile telephone to interrupt the call). In this way, the losses of the true owner of the credit card and/or the mobile telephone and/or the losses of the concerned bank and telephone company can be minimized, or can be avoided. In this way, commercial crimes of illegally using non-cash instant payments will be reduced or eliminated. This invention will bring great benefits to society and for the economy of the country.

The computer account writing system 2 can be the present computer account writing system used in banks and used in telephone companies with an additional output device 2b. The output device 2b is used for transferring the transaction information of the true owner to the transaction signal transmitting station 3. The transaction signal transmitting station 3 can be the present widely used various paging systems and paging stations or other transmitting stations. The account receiver 4 can be a pager, a portable pager, a table pager, or a watch or clock with CPU 4g and immediate draw attention unit 4e and display panel 4f which can receive and display the transaction information signals. Or, a mobile telephone, general telephone, or a computer, or a specially designed electric or electronic device which can receive and display the transaction information signals and have a draw immediate attention unit, etc, can be used.

Figure 3A:
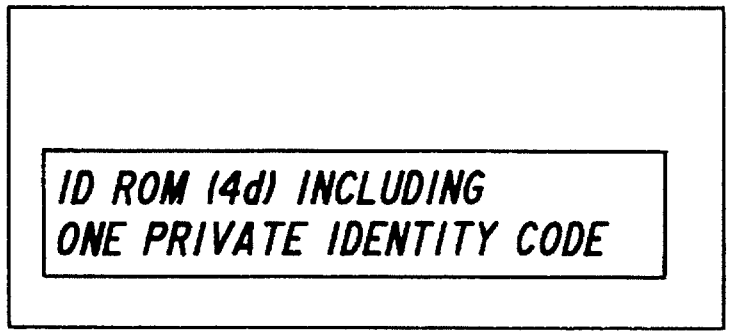
FIG. 3 is an illustration of private address codes stored within an account receiver.
Figure 3B:
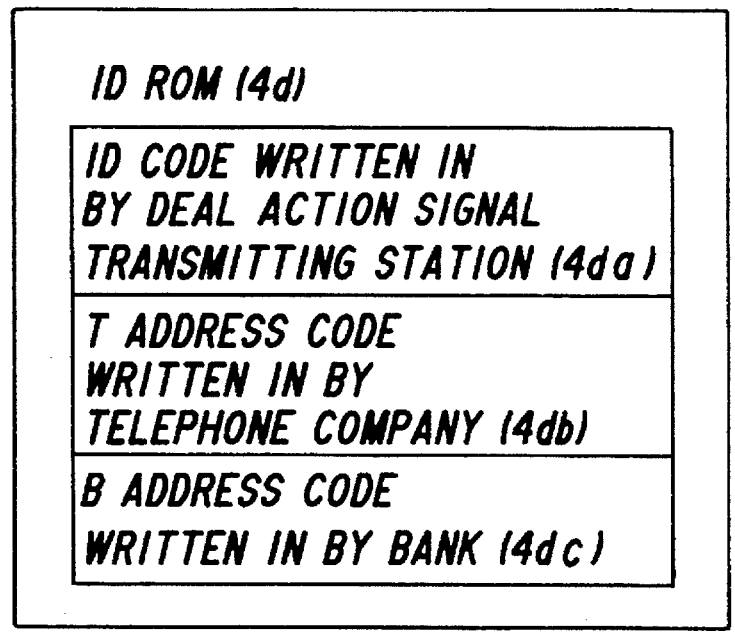

FIG. 3 is an illustrating figure of ID ROM 4d of the account receiver 4. In the account receiver 4, there must be one private identity address code written to the ID ROM 4d by the transaction signal transmitting station 3. We know that the paging station must give every pager an address code in order to differentiate one from another. It is by the address code, that the message to one pager will not be sent to another's pager. The address code can be a number with several digits, such as 8-digit number, 10-digit number, etc. The person who carries the pager need not know the number (the private identity address code). The private identity address code can be written in advance by the pager manufacture, or can be written in by the paging station with a method of electron feeding after the user selects the number within a particular number range. Or, the private identity address code can be decided by the user by knocking the number bottoms or keyboard of the account receiver 4 and then the user informs the paging station of his new code. Generally speaking, there is at least one private address code in the ID ROM 4d of the account receiver 4, such as illustrated in FIG. 3-1.

Since the account receiver 4 of this invention must be able to receive transaction signals, for example, in order that the account receiver 4 can receive the transaction signals of various credit cards, when the output device 2b of the bank computer account writing system transmits the transaction signals, the distinguishing code of the true owner of the credit card must be added. For example, the distinguishing code of that person is CB12450 and the transaction signal is B25. The display panel 4f of the account receiver 4 will show the symbol CB 12450+B25.

Referring to FIG. 3-2, if it is desired to receive the transaction signals due to the use of credit cards, it can be arranged with the concerned bank (issuing credit cards), considering the bank's computer system, to "write-in" as such by means of an electron feeding beam, a "B" address code in the ID ROM 4d of the account receiver 4 which can distinguish other's credit cards. For every credit card, the bank writes a "B" address code 3dc for the true owner—the credit card owner in the ID ROM 4d of the account receiver 4. In the same way, for every mobile telephone such as cellular telephone, the telephone company will combine his computer account writing system (2), "written in" such as by electron feeding method, as a "T" address code 4db in ID ROM 4d of the account receiver 4 for the true owner. Then, in the account receiver 4, there is at least one "ID code" 4da written in by the transaction signal transmitting station, one "T address code" 4db written in by the telephone company, and/or one "B address code" 4dc written in by the bank.

Of course, all the "codes" written in can also be accomplished such as by a pager manufacture. Thus, usually there are 2–3 address codes in the account receiver 4. Thus, when the transaction is happening, such as in the example mentioned above, the display panel 4f of the account receiver 4 will only be shown as "B25" instead of "CB12450+B25". Since a B address code was already written in the account receiver 4, the symbol CB12450 can be saved and more transaction information symbols can be shown in the display panel 4f, such that transaction information can be presented to the true owner. The whole system can therefore, be more effective.

Figure 4:
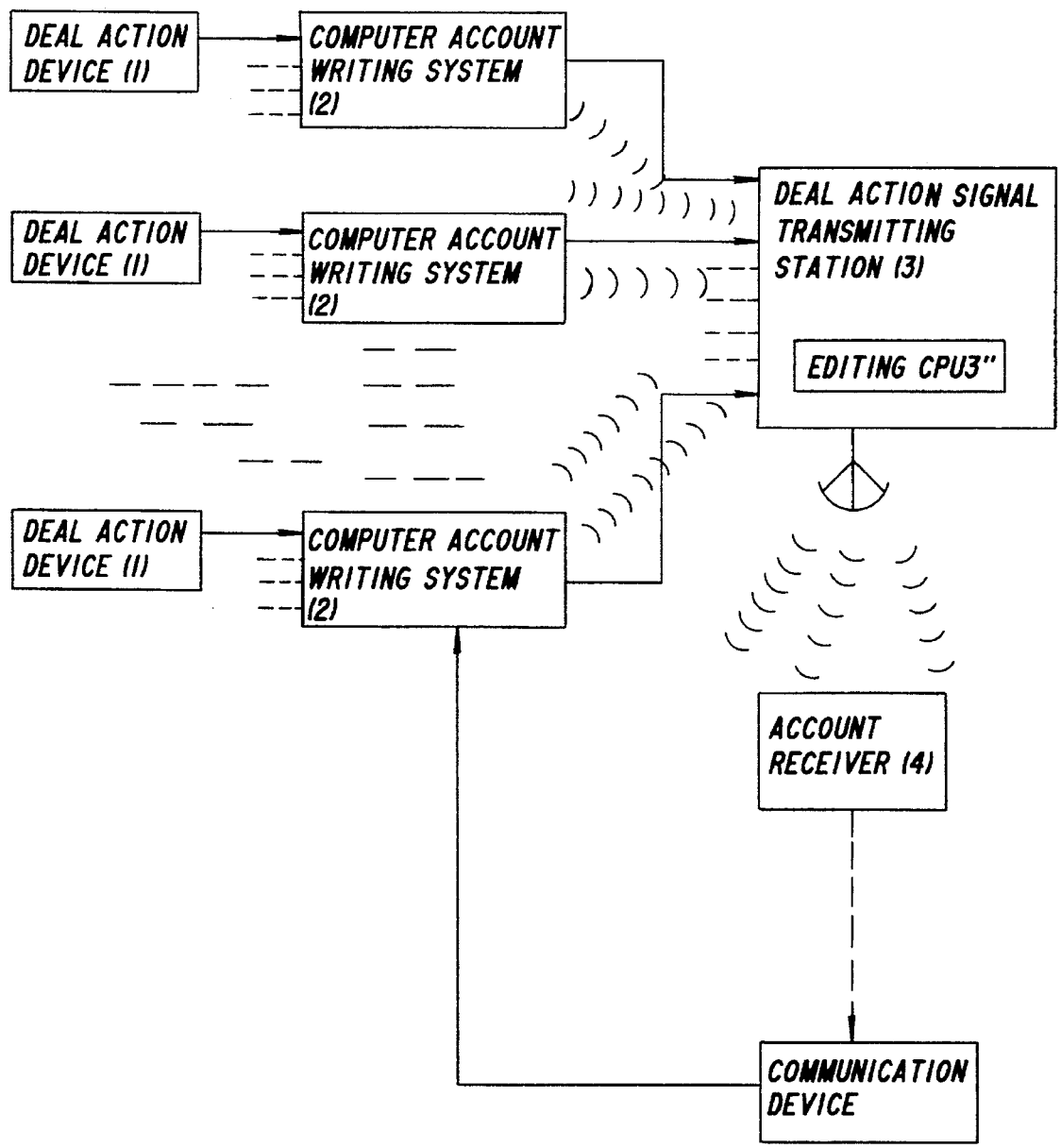
FIG. 4 is an illustration of a number of computer writing systems going through a transaction signal transmitting station to transmit the transaction signals.

FIG. 4 shows a second embodiment where many computer account writing systems (2) go through one transaction signal transmitting station 3. The whole process is similar to the process in FIG. 2. Since the transaction signal transmitting station 3 is connected with many computer account writing systems 2, the code editor 3a should increase the working room and speed along with the increasing of the transaction information. Therefore, the code editor 3a is replaced by CPU 3a' in FIG. 4.

Since the present computer can calculate several hundred million times within one second and the transferring speed of the electric wave is the speed of light (300 thousand kilometers per second), the whole process from the occurrence of the transaction to the presenting display and drawing attention unit acting of the account receive 4 may take place within several seconds, so the system of the present invention works efficiently and effectively.

Figure 5:
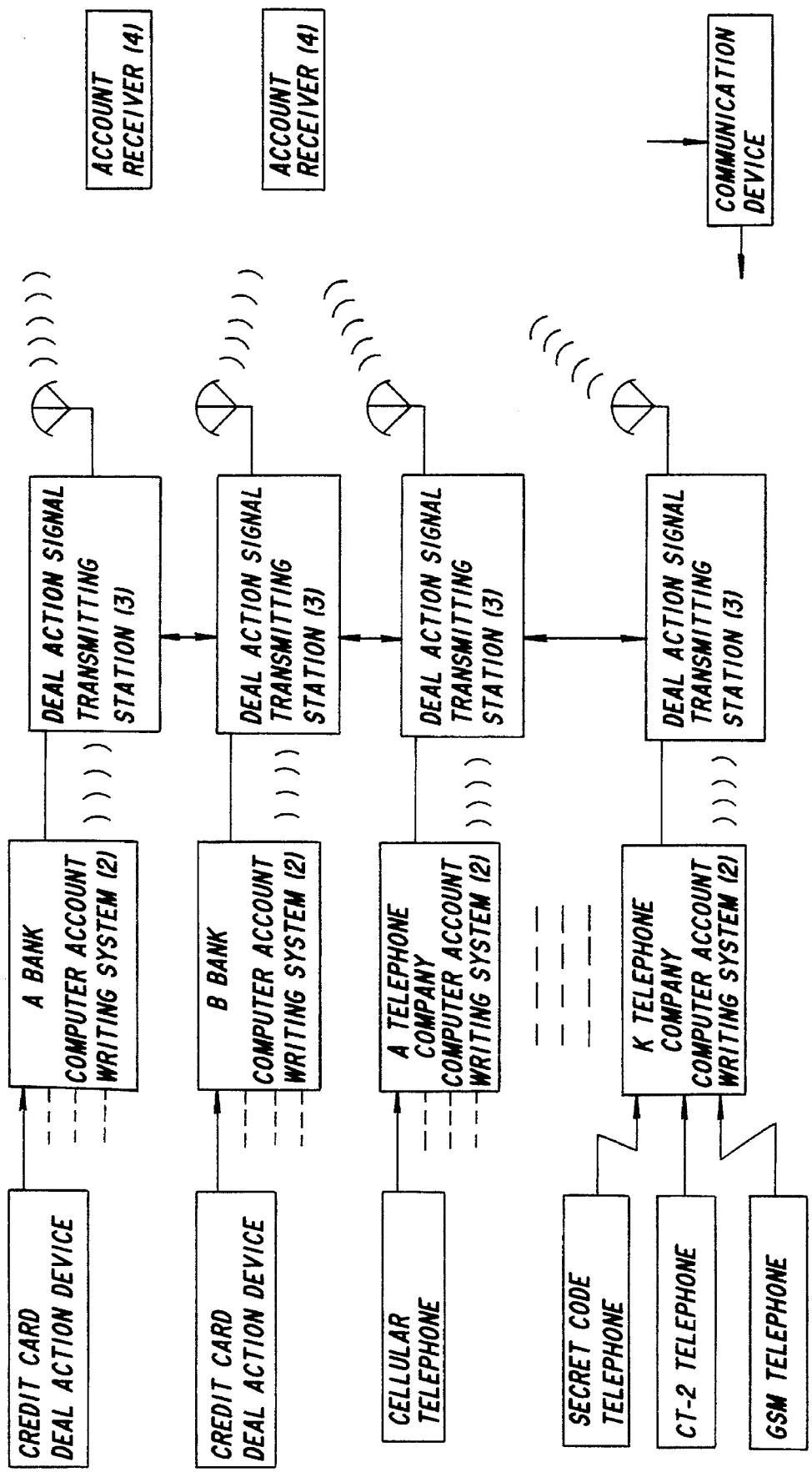
FIG. 5 is an illustration of a plurality of account writing systems going through a number of transaction signal transmitting stations to transmit the transaction signals.

FIG. 5 is a third embodiment, in which many computer account writing systems 2 go through many transaction signal transmitting stations to transmit transaction information.

Referring to FIG. 5, the transaction information signals can be transferred among the transaction signal transmitting stations and every transaction signal transmitting station can transmit the transaction information signals. In this way, based on this example, the system of this invention can be used and extended to one region, one country, several countries and even extended to all the countries of the world.

Figure 6:
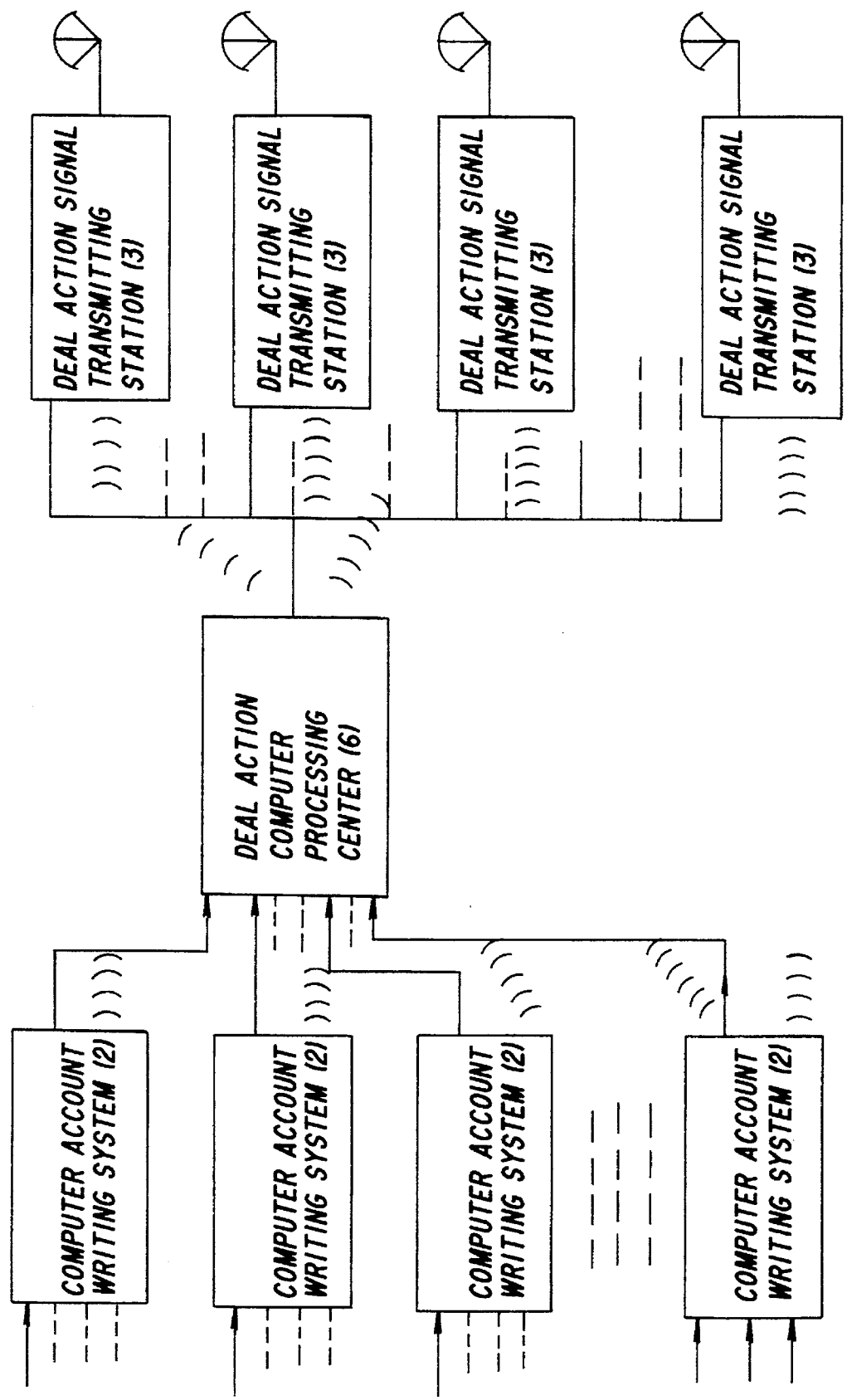
FIG. 6 is an illustration of the setup of the transaction signal computer processing center.

FIG. 6 is a fourth embodiment. Between the plurality of computer account writing systems 2 and the plurality of transaction signal transmitting stations 3, is a transaction computer processing center 6, which can process a large number transaction information signals coining from the plurality of computer account writing systems 2 and can immediately transfer them to the correct transaction signal transmitting station to transmit out. The rest of the process is the same as with the process stated in FIG. 2.

Figure 7:
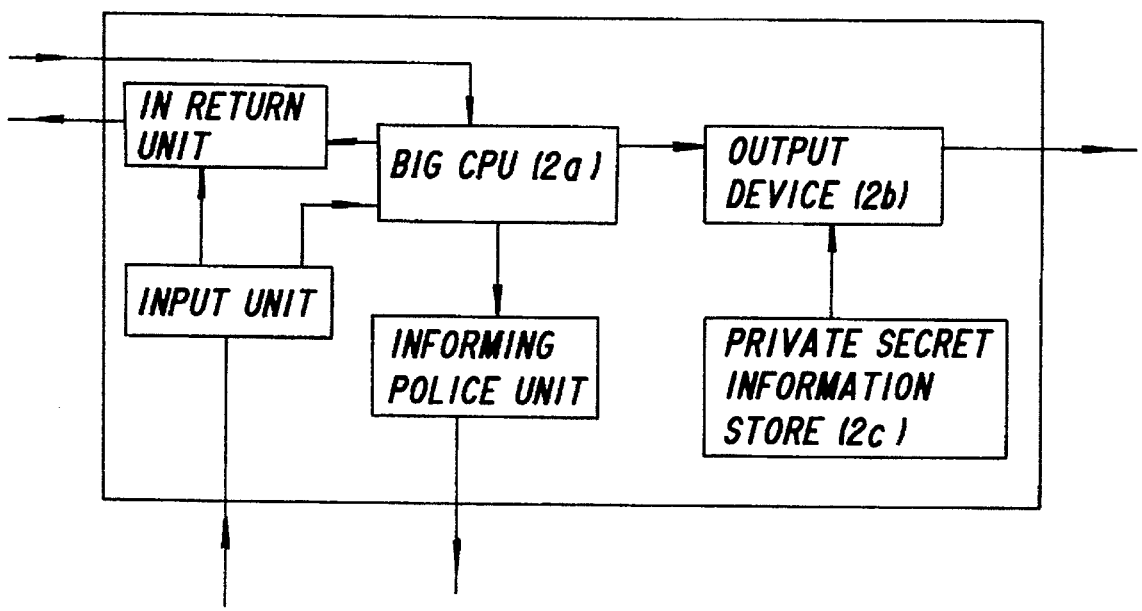
FIG. 7 is an illustration of the setup of additional informing police units in the computer writing system.

FIG. 7 is a fifth embodiment. The informing police unit 2F is newly added into the computer account writing system 2 than that in FIG. 2. The computer account writing system 2 should have a large high speed computer so that the method and the apparatus of the invention can be well executed. Referring to FIG. 7, based on FIG. 2, the informing policy unit 2F is added. Before the in return unit sends the instruction to refuse the transaction device, several seconds prior, the informing police unit 2f operates to inform the police that a commercial crime is happening and where it is taking place so that the police can take immediate action to seize person(s) involved.

When large capability computers are used, the information of transactions can be processed in more detail, so that in the account receiver 4, more information can be displayed, such as: which type of consumption is taking place, which kind of "card", the number of the credit card, how much money will be spent, which kind of telephone (mobile telephone, car telephone, cellular telephone, secret code telephone), the place and the time of using the telephone, the receiving telephone number, the place of the credit card, etc. This information can be displayed by symbols, words and/or characters. Thus, the true owner can take necessary action to stop the illegal transaction.

The invention has been described with reference to its preferred embodiments which are intended to be illustrative and not limiting. Various changes may be made without departing from the spirit and scope of the invention as defined in the following claims.

What is claimed is:

1. A method of informing the owner of an account that a non-cash transaction is taking place relative to the account, comprising:

providing a transaction device, a computer account writing system of a company associated with the owner's account, a transaction signal transmitting station, and an account receiver;

electronically transmitting information from the transaction device to the computer account writing system of the company associated with the owner's account so as to transmit information concerning a non-cash transaction taking place;

referring in the computer account writing system to a private address code of the owner of the account;

outputting signals including transaction information signals by utilizing an output device in the computer account writing system to a transaction signal transmitting station;

processing signals received from the output device in the transaction signal transmitting station;

transmitting transaction signals from the transaction signal transmitting station to an account receiver of the account owner;

informing the owner of the account of the nature of the non-cash transaction; and waiting a predetermined period of time before granting authorization for the non-cash transaction, so as to give the owner of the account an opportunity to prevent the non-cash transaction.

2. The method of claim 1, wherein the signals transmitted from the transaction device are signals being transmitted from at least one of a credit card reading device and a telephone.

3. The method of claim 2, wherein the telephone is at least one of a mobile telephone, car telephone, cellular telephone, and secret code telephone.

4. The method of claim 2, wherein the transaction information is information concerning at least one of the place of using the telephone, the time of using the telephone, and the telephone number dialed.

5. The method of claim 2, wherein the transaction device is a credit card reading device, and the transaction information is information concerning at least one of the place of use of the credit card, the type of desired purchase, and the amount of the desired purchase.

6. The method of claim 1, wherein when said signals are transmitted from the output device of the computer account writing system to the transaction signal transmitting station, a wireless transmitting or wire transmitting method is used.

7. The method of claim 6, wherein the wire transmitting system comprises at least one of a telephone line network and a communication cable.

8. The method of claim 1, wherein the account receiver includes a draw attention unit having at least one of a sound device, a vibration unit and a LCD unit.

9. The method of claim 8, wherein the account receiver is a pager, telephone or computer.

10. The method of claim 1, wherein the account receiver has a private identity address code for allowing the transaction signal transmitting station to transmit information directly to the account receiver.

11. The method of claim 1, wherein a plurality of computer account writing systems can communicate with said transaction signal transmitting station.

12. The method of claim 11, wherein a plurality of computer account writing systems communicate through a plurality of transaction signal transmitting stations.

13. The method of claim 12, wherein transaction information output from the plurality of computer account writing systems to the plurality of transaction signal transmitting stations is transmitted via a transaction computer processing center.

14. The method of claim 1, further comprising the step of informing police of an unauthorized non-cash transaction if the owner of the account communicates via a communication device within the predetermined period of time with the computer account writing system so as to stop the non-cash transaction.

15. A security system according to claim 1, wherein secondary communication means are provided for allowing the owner of the account to authorize or prevent the attempted non-cash transaction.

16. The security system according to claim 1, wherein a computer account writing system is provided in communication with the transaction device, the computer account writing system for receiving details of the attempted non-cash transaction and being operable for communicating information concerning the attempted transaction to the owner of the account.

17. A security system for preventing fraudulent non-cash transactions comprising:

a computer account writing system;

a transaction signal transmitting station; and an account receiver;

wherein the transaction device comprises at least one of a card reading device for reading a card and a telephone;

wherein when a non-cash transaction is attempted, the transaction device creates transaction information and transfers the transaction information to the corresponding computer account writing system, and further wherein the computer account writing system processes the transaction information signals from the transaction device and compares a private address code of the owner of the account with a code in a private secret information store, these information signals to the transaction signal transmitting station, the transaction signal transmitting station comprising a code editor, program controller, saving and private address code store and transmitter; wherein the code editor combines the private address code of the owner of the account in the saving and private address code store, and encodes the transaction information signals received, the program controller for ordering the transmitter to immediately transmit the coded signals of the transaction information signals combined with the private address code;

the account receiver including a receiver, decoder RAM ID ROM draw attention unit, display panel and a CPU;

the receiver for receiving the encoded information signals related to the private address code transmitted from the transaction signal transmitting station, and sending to the decoder to decode by controlling the CPU to start the draw attention unit to provide at least one of sound, vibration, LCD flash to indicate incoming information, and on a display panel of the draw attention unit, displaying transaction information symbols and storing the transaction information in the RAM for later use the security system further comprising; a transaction device for registering an attempted non-cash transaction related to an owner's account; and communication means for alerting the owner of the account that an attempted non-cash transaction is taking place.

18. A security system according to claim 17, wherein the computer account writing system is a credit card computer account writing system used in a bank having an additional output device, and the card reading device is a credit card reading device tier reading at least one of a credit card, member card, club card and magnetic card.

19. A security system according to claim 17, wherein the computer account writing system is a telephone account computer system used in a telephone company with an additional output device, and the transaction device comprises at least one of a mobile telephone, cellular telephone, car telephone and secret code telephone.

20. A security system according to claim 17, wherein the transaction signal transmitting station is a paging system or station.

21. A security system according to claim 17, wherein the account receiver is selected from the group consisting of a portable pager, a table pager, a watch, a mobile telephone, a general telephone, a computer, and an electric/electronic device for receiving transaction information signals and displaying the transaction information and alerting the owner of the account.

22. A security system according to claim 17, wherein the ID ROM of the account receiver has at least a private address code/ID code written in by the transaction signal transmitting station and/or further address codes written in by a telephone company or bank computer account writing system.

23. A security system according to claim 17, wherein the transaction signal transmitting station sends different display symbols which correspond to different types of non-cash transactions.

24. A security system according to claim 17, wherein a plurality of computer account writing systems and transaction signal transmitting stations are provided connected into a network whereby the signal cover area transmitted by the transaction signal transmitting station can be covered as needed.

25. A security system according to claim 17, wherein a transaction signal computer processing center is provided for increasing a number of transaction signals and for enhancing processing speed of the signals.

26. A method of utilizing an electric or electronic communication system for immediately informing an owner of an account that a non-cash transaction is being attempted relating to the owner's account, comprising during the time a transaction is being attempted, transmitting information concerning the attempted transaction to the owner of the account, allowing the owner of the account to decide whether or not the transaction is authorized, and informing the transaction device of the owner's decision to allow the attempted transaction or not.

\* \* \* \* \*